J. B. Tarr,
Fire Engine,

N°. 6,859.  Patented Nov. 6, 1849.

N. PETERS, PHOTO-LITHOGRAPHER, WASHINGTON, D.C.

UNITED STATES PATENT OFFICE.

JOHN B. TARR, OF ALBANY, NEW YORK.

FIRE-ENGINE.

Specification of Letters Patent No. 6,859, dated November 6, 1849.

*To all whom it may concern:*

Be it known that I, JOHN B. TARR, of the city and county of Albany and State of New York, have invented a new and useful Improvement in Brakes for Fire-Engines, which is described as follows, reference being had to the annexed drawings of the same making part of this specification.

Figure 1:
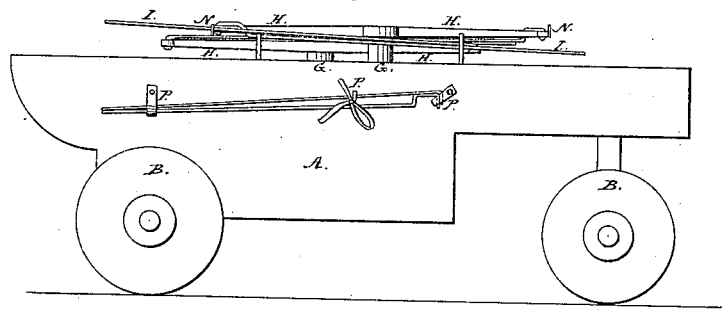
Figure 2:
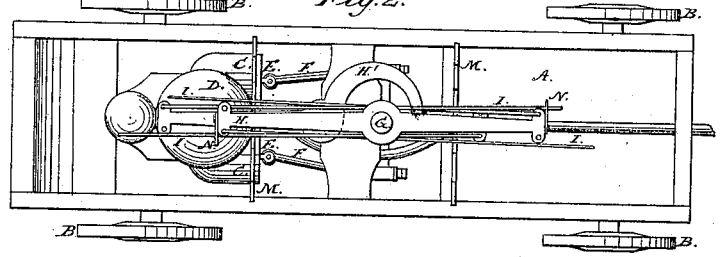
Figure 3:
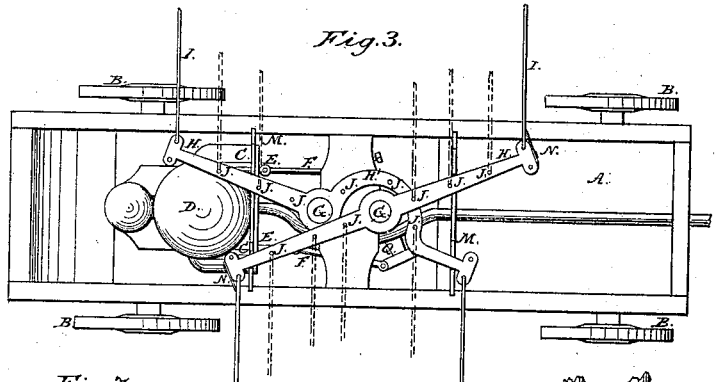
Figure 7:
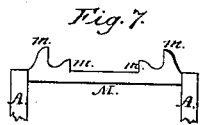
Figure 6:
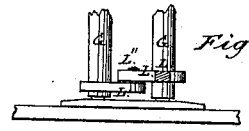
Figures 4, 5:
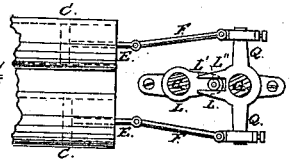

Figure 1, is a side elevation of a fire engine with the brakes and rods folded and secured to the engine ready to be moved forward to the place where it is required to be used. Fig. 2, is a top view of ditto. Fig. 3, is a top view of the engine, showing the brakes and rods in action. Fig. 4 is a horizontal section showing the two vertical axles to which the brakes are attached, their connection of each other and with the piston rods of the engine, the pistons being at rest. Fig. 5 is the same view as Fig. 4, except that the pistons are shown in action. Fig. 6 is a side elevation, showing sections of the two vertical propelling axles and their connection. Fig. 7 is a plan of one of the transverse stop bars.

Similar letters in the several figures refer to corresponding parts.

The nature of my invention and improvement, consists in combining and arranging an auxiliary brake with a horizontal brake, in such manner, that any required number of transverse parallel propelling rods can be attached to them by which any desired number of hands can exert their physical power to the brakes in a standing position upon the ground simultaneously, thus doing away with the present modes of working the brakes from the top of the engine which is not only excessively laborious but limited as to the number of men who can apply their power simultaneously.

Description: A is the body of the common fire engine. B, B, B, B, are the four wheels upon which it rests and travels. C, C, are the cylinders. D is the air chamber. E, E, are piston rods, the pistons being shown by dotted lines in Figs. 4 and 5. F, F, are the rods connecting the arms of the axle of the brake and the piston rods. The above named parts are made in the usual manner.

G, G, are two vertical parallel axles to which the brakes H H are affixed, said axles turning in suitable bearings in the body of the engine. The brakes are affixed to the upper ends of the axles G. One of them is straight, the other has a bend in it at H' that it may vibrate without touching the axles of the straight brake.

The brakes are operated simultaneously in opposite directions until arrested by stops. I are the pushing and pulling rods for operating the brakes attached to the latter, and moved by the firemen who stand on the ground in parallel rows at right angles to the engine arranged according to their different sizes. The largest sized firemen who are capable of giving the greatest stroke, having hold of the rods that are farthest from the axles. The smallest sized firemen having hold of the rods attached to the brakes nearest the axles G: the last named rods being represented in the drawings by dotted lines. The intermediate sizes of firemen being arranged opposite the intermediate rods according to their strength of action. The holes to receive these intermediate rods are shown at J, Fig. 3.

L' L" is the coupling of the two axles G, G, consisting of two radial arms L, L, of the axles G, G, Figs. 4 and 5, an oblong slot L' being in one of them and an antifriction wheel L" being attached to the other arm traversing back and forth in said slot as the arms are vibrated and by which the connection is maintained and the power of the auxiliary or curved brake is conveyed and communicated to the axle of the straight brake whose arms are connected to the piston rods.

M are transverse stop bars affixed permanently to the body of the engine having stops (*m*) against which the brakes strike when vibrated and by which their sweep or movement is determined and consequently that of the pistons, one of these bars is seen more clearly at Fig. 7.

N are catches or hooks for securing the propelling rods against the sides of the brakes when not in use as represented at Figs. 1 and 2.

P are loops secured to the sides of the engine in which some of the propelling rods are suspended when disengaged from the brakes as represented in Fig. 1. The rest of the engine is made in the usual manner.

When the brakes are being operated the propelling rods I will be in the position represented in Fig. 3. Any required number of men will lay hold of the rods, move them back and forth in parallel lines at right angles to the engine causing the brakes to vibrate as far as the stop (*m*) on the bars M will permit, at the same time turning the axles G alternately to the right and left and causing the arms Q to vibrate and operate the pistons through the intervention of the connecting rods F and thus to throw the water.

The upright position of the firemen upon the ground in parallel lines at right angles to the engine admits of the proper application of the power of a greater number of men and boys than the old plans, the men having hold of the rods farthest from the center of motion where the sweep will be the greatest and the boys operating the rods nearest the center of motion where the sweep is the least. These rods when not in use being secured to the brakes in a position parallel to the sides of the engine will not be liable to come into contact with the objects in the road as in the use of the ordinary transverse brakes that extend over and beyond the sides of the engines, which are liable to strike objects with great force when the engine is being drawn forward with great speed.

What I claim as my invention and desire to secure by Letters Patent is—

The combination of the horizontal vibrating brakes G, H, with the engine A, B, C, D, said brakes being so constructed and arranged that any desired number of hands may conveniently apply their united power to the alternate action of the pistons while standing upon the ground in parallel rows at right angles to the sides of the engine, the handles or propelling rods being so connected with the brakes that they can be brought parallel with and connected to them so as not to extend beyond the sides of the engine when the latter is not in use, by which the advantages enumerated in the foregoing specification are obtained.

In testimony wherof I have hereunto signed my name before two subscribing witnesses.

JOHN B. TARR.

Witnesses:
Wm. P. Elliot,
A. E. H. Johnson.